United States Patent [19]

Wachi

[11] Patent Number: 4,551,661
[45] Date of Patent: Nov. 5, 1985

[54] DRIVING APPARATUS FOR A RECORDING MEDIUM

[75] Inventor: Shigeaki Wachi, Higashikurume, Japan

[73] Assignee: Sony Corporation, Tokyo, Japan

[21] Appl. No.: 540,977

[22] Filed: Oct. 11, 1983

[30] Foreign Application Priority Data

Oct. 14, 1982 [JP] Japan .................................. 57-180222

[51] Int. Cl.$^4$ ................................................ G05B 5/00
[52] U.S. Cl. .................................... 318/314; 318/329; 318/601
[58] Field of Search ..................... 318/6, 314, 329, 326, 318/327, 601; 360/73

[56] References Cited

U.S. PATENT DOCUMENTS

| | | | |
|---|---|---|---|
| 3,386,021 | 5/1968 | Fischer | 318/329 |
| 3,843,914 | 10/1974 | Carlson et al. | 318/327 |
| 3,950,682 | 4/1976 | Dohanich | 318/314 |
| 4,236,050 | 11/1980 | Winslow et al. | 360/73 X |

Primary Examiner—Ulysses Weldon
Attorney, Agent, or Firm—Lewis H. Eslinger; Alvin Sinderbrand

[57] ABSTRACT

A driving apparatus for a recording medium which includes a motor for driving a recording medium, a preset counter for counting either of a reference clock signal and a signal provided by multiplying a reproduced synchronizing signal, the preset counter being reset in response to a synchronizing signal in a reproduced signal when the reference clock signal is counted and being reset in response to a reference synchronizing signal when the signal which is provided by multiplying the reproduced synchronizing signal is counted, and a circuit for producing an analog electrical signal corresponding to a time interval during from a time when a count value of the preset counter reaches its preset value to a reset time of the preset counter, wherein the motor is so controlled by the analog electrical signal that the moving speed of the recording medium relative to a pickup is made constant.

5 Claims, 12 Drawing Figures

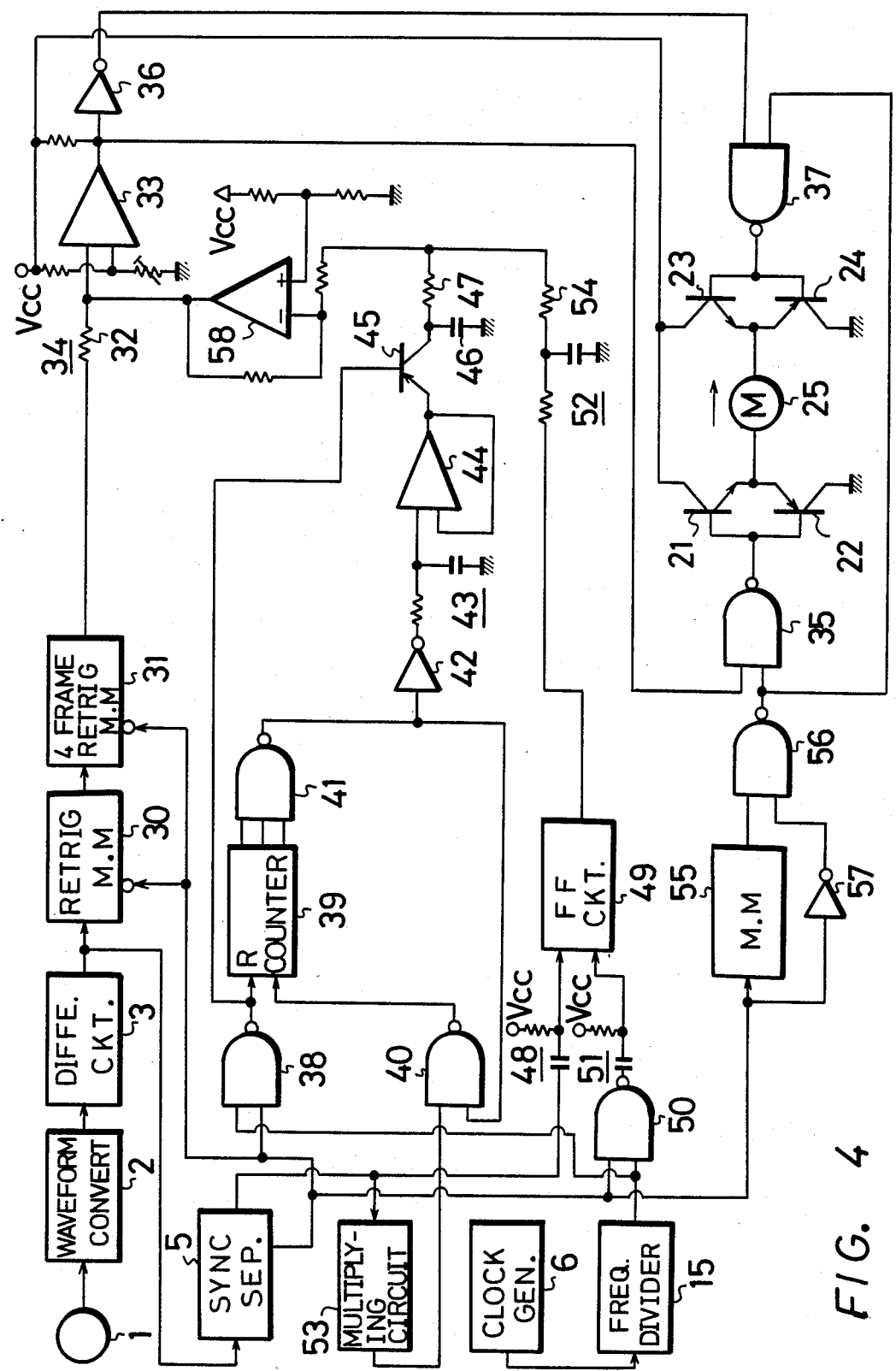
F I G. 4

DRIVING APPARATUS FOR A RECORDING MEDIUM

BACKGROUND OF THE INVENTION

1. Field of the Invention

The present invention generally relates to a driving apparatus for a recording medium by which the moving speed of a recording medium relative to a pickup is kept constant. More particularly, this invention relates to a driving apparatus for a recording medium which is suitable for use with, for example, an optical compact disc player.

2. Description of the Prior Art

In the optical compact disc, by way of example, a signal is generally recorded on the disc as a spiral track from the inner periphery of the disc to its outer periphery at the constant linear velocity. Therefore, when such optical compact disc is reproduced, a servo has to be applied for the disc rotation so that the disc is rotated at the same constant linear velocity as that upon recording.

In that case, it has been proposed that a distance between the reproducing position of, for example, a pickup and the center of the disc is detected, the rotation speed of the disc is measured by calculating the detected distance and thereby the servo is applied to the disc rotation on the basis of the measured rotation speed. This previously proposed method, however, urges the calculating circuit and so on to be complicated, and also the servo accuracy is not so high.

By the way, in the recording of the compact disc, the coding according to the so-called run length limited code system is generally employed in which the minimum and maximum numbers of a series of, for example, "0"s are determined, and in which such a pattern in which "0" continues at maximum (for example, 11) exists without failure at every predetermined period as a frame synchronizing signal.

Accordingly, the present inventor has previously proposed the servo circuit as shown in FIG. 1. As shown in FIG. 1, a signal reproduced from a disc (not shown) by a photodetector 1 is suppled to a waveform converting circuit 2 and then to a differentiating circuit 3 from which is reproduced the signal which corresponds to "0" or "1". This reproduced signal is supplied to a first fixed contact A of a selector circuit 4. The signal from the differentiating circuit 3 is also supplied to a synchronizing separating circuit 5. The synchronizing separating circuit 5 includes a PLL (phase locked loop) in which a frame synchronizing signal is separated in synchronism with the clock signal in the reproduced signal, while the lock range of the PLL is made narrow and the indicating signal of "0" is delivered when the PLL is not locked. The frame synchronizing signal thus separated is supplied to a second fixed contact B of the selector circuit 4. Further, there is provided a reference clock generator 6. This reference clock generator 6 generates a reference clock signal with the frequency same as the clock signal (for example, 2.16 MHz) in the reproduced signal when the predetermined servo is made effective. This reference clock signal is supplied to a frequency dividing circuit 7 which produces a signal corresponding to four frame synchronizing signals (four frames). This signal is supplied to a third fixed contact C of the selector circuit 4.

The indicating signal indicative of the locked state of the PLL from the synchronizing separating circuit 5 is supplied to the selector circuit 4 as its control signal so that a movable contact D of the selector circuit 4 is connected to the fixed contact A during the period through which this indicating signal is "0". Usually, the movable contact D of the selector circuit 4 is connected to its fixed contact B. The signal from the selector circuit 4 is supplied to a reset terminal of a counter 8, while the clock signal from the clock generator 6 is supplied to the count terminal of the counter 8.

When the continuous number of "0" in the frame synchronizing signal is for example, 11, the output regarding the count value [8] from the counter 8 is supplied to a NAND circuit 9. Also, the output regarding the count value [2] from the counter 8 is supplied to the NAND circuit 9 through a delay circuit 10. Thus, the NAND circuit 9 normally generates an output "1", and at a time point corresponding to a time point when the counter valve becomes [11] after a predetermined delay time since the count value has become [10], the output of the NAND circuit 9 becomes "0". The output signal from the NAND circuit 9 is supplied to the enable terminal of the counter 8 so that the output of the counter 8 is fixed to the count value [11]. The output from the NAND circuit 9 is also supplied to the selector circuit 4 as its control signal so that in the period during which this signal is "0" the movable contact D of the selector circuit 4 is connected to the fixed contact C.

Further, the output from the NAND circuit 9 is supplied through an inverter 11, a low-pass filter 12 and a resistor 13 to an inverter 14.

The clock signal from the clock generator 6 is supplied to a frequency dividing circuit 15 which then generates a reference frame synchronizing signal. This reference frame synchronizing signal and the reproduced frame synchronizing signal from the synchronizing separating circuit 5 are fed to a flip-flop circuit 16 which then generates an output corresponding to the phase difference therebetween. This output is supplied through a NAND circuit 17, a low-pass filter 18 and a resistor 19 to the inverter 14.

Thus from the inverter 14 is derived the output corresponding to the period in which the output from the counter 8 is [11] and corresponding to the phase difference between the reference frame synchronizing signal and the reproduced frame synchronizing signal.

The output from the inverter 14 is supplied to a NAND circuit 20 and the lock indicating output from the synchronizing separating circuit 5 is supplied to the NAND circuit 20. The output from the NAND circuit 20 is supplied to the bases of an npn transistor 21 and a pnp transistor 22, while the output from the inverter 14 is supplied to the bases of an npn transistor 23 and an pnp transistor 24. The collectors of the transistors 21 and 23 are connected together to a voltage source terminal $V_{cc}$, while the collectors of the transistors 22 and 24 are together grounded. Further, the emitters of the transistors 21 and 22 are connected together, while the emitters of the transistors 23 and 24 are connected together. A spindle motor 25 for rotating a disc is connected between the above emitter connection points.

With this circuitry, until the PLL in the synchronizing separating circuit 5 is locked, the signal "0" is supplied to the NAND circuit 20 and hence the output from the NAND circuit 20 is "1" so that the transistor 21 is turned on but the transistor 22 is turned off. At that time, since the movable contact D of the selector circuit 4 is connected to the fixed contact A, the reproduced signal is directly supplied to the counter 8. As a result, when the disc rotation is slow and the signal is dull, the count value of the counter 8 quickly becomes [11] so that the output from the NAND circuit 9 becomes "0". By this output, the counter 8 is stopped and the selector circuit 4 is changed in position or its movable contact D is connected to the fixed contact C so that the counter 8 is stopped for four frame periods. Since the output from the NAND circuit 9 is "0", the output from the inverter 14 becomes "0". Thus, the transistor 23 is turned off and the transistor 24 is turned on to thereby allow a current to flow through the spindle motor 25 in the arrow direction, thus increasing the rotation speed of the spindle motor 25.

In consequence, the rotation speed of the disc is being continuously increased until the maximum interval of the signals becomes approximately 11 clocks.

At that time, the PLL in the synchronizing separating circuit 5 is locked, the selector circuit 4 is changed in position or its movable contact D is connected to the fixed contact B and the signal "1" is supplied to the NAND circuit 20. As a result, the separated frame synchronizing signal is supplied to the counter 8. When the length of the synchronizing signal reaches more than 11 clocks, the output of the NAND circuit 9 becomes "0" during four frame periods, the output from the inverter 14 becomes "0", the output from the NAND circuit 20 becomes "1" so that the transistors 21 and 24 are turned on and the transistors 22 and 23 are turned off to thereby allow the current to flow through the spindle motor 25 in the arrow direction. Therefore, the rotation speed thereof becomes high. On the other hand, when the length of the synchronizing signal becomes less than 11 clocks, the output from the NAND circuit 9 becomes "1", the output from the inverter 14 becomes "1" and the output from the NAND circuit 20 becomes "0" so that the transistors 21 and 24 are turned off and the transistors 22 and 23 are turned on to thereby allow the current to flow through the spindle motor 25 in the direction counter to the arrow direction, thus lowering the rotation speed thereof.

As a result, the rotation speed servo is applied to the disc so as to make the length of the synchronizing signal equal to 11 clocks.

At that time, the flip-flop circuit 16 produces the output signal which becomes "1" during the period from the reproduced synchronizing signal to the reference synchronizing signal and "0" during the period from the reference synchronizing signal to the succeeding reproduced synchronizing signal. For this reason, when the reproduced synchronizing signal gets behind the position at which the phase difference between the reproduced synchronizing signal and the reference synchronizing signal is 180°, the period during which the signal is "0" becomes long, while when the reproduced synchronizing signal goes ahead of that position, the period during which the signal is "1" becomes long. And, when the signal is "0", the output from the NAND circuit 17 becomes "1", the output from the inverter 14 becomes "0" and the output from the NAND circuit 20 becomes "1", thus the rotation speed of the spindle motor 25 is raised. Conversely, when the signal is "1", the rotation speed of the spindle motor 25 is lowered.

As a result, the rotation phase servo is applied to the disc so as to make the synchronizing signal at the predetermined position.

As described above, the rotation speed servo of the constant linear velocity and the rotation phase servo are applied to the disc. In this case, since the pull-in of the rotation speed of the disc at the beginning is carried out also by the use of the counter 8, the pull-in operation of the speed can be made by a simple circuitry.

In the case of such previously proposed servo circuit, however, since the rotation speed servo is performed by detecting the length (11 clocks) of the synchronizing signal with the clock signal, the accuracy of the rotation speed servo becomes as significantly rough as 1/11.

If in the phase servo system, by way of example, the frame synchronizing signal is multiplied and the phase servo is made effective with the frequency (for example, 7.35 kHz) higher than that of the inherent frame synchronizing signal, the accuracy of the speed servo has to be raised. In that case, the above rough servo can not raise the frequency of the phase servo and hence the superior servo can not be carried out.

OBJECTS AND SUMMARY OF THE INVENTION

Accordingly, it is an object of the present invention to provide a driving apparatus for a recording medium which can perform the speed servo with quite high accuracy by simple circuitry.

It is another object of the present invention to provide a driving apparatus for a recording medium which can perform the superior phase servo by simple circuitry.

It is a further object of the present invention to provide a driving apparatus for a recording medium which can prevent the erroneous rotation from being made when a dropout occurs in a reproduced signal.

It is a still further object of the present invention to provide a driving apparatus for a recording medium which is suitable for use with an optical compact disc player.

According to one aspect of the present invention, there is provided a driving apparatus for a recording medium comprising:

a motor for driving a recording medium;

a preset counter for counting a reference synchronizing clock signal and being reset by a synchronizing signal in a reproduced signal; and a circuit for producing an analog electrical signal corresponding to a time interval from a time when a count value of said preset counter reaches its preset value to a reset time of said preset counter; wherein said motor is controlled by said analog electrical signal such that moving speed of said recording medium relative to a pickup is made constant.

According to another aspect of the present invention, there is provided a driving apparatus for a recording medium comprising:

a motor for driving a recording medium;

a preset counter for counting a signal which is provided by multiplying a reproduced synchronizing signal and being reset by a reference synchronizing signal; and a circuit for producing an analog electrical signal corresponding to a time interval from a time when a count value of said preset counter reaches its preset value to a reset time of said preset counter; wherein said motor is controlled by said analog electrical signal such that moving speed of said recording medium relative to a pickup is made constant.

The other objects, features and advantages of the present invention will become apparent from the following description taken in conjunction with the accompanying drawings through which the like reference designate the same elements and parts.

BRIEF DESCRIPTION OF THE DRAWINGS

FIG. 4 is a systematic block diagram showing another embodiment of the driving apparatus for a recording medium with a servo circuit according to the present invention.

DESCRIPTION OF THE PREFERRED EMBODIMENTS

Now, the driving apparatus for a recording medium with a servo circuit according to the present invention will hereinafter be described with reference to the attached drawings.

Figure 1:
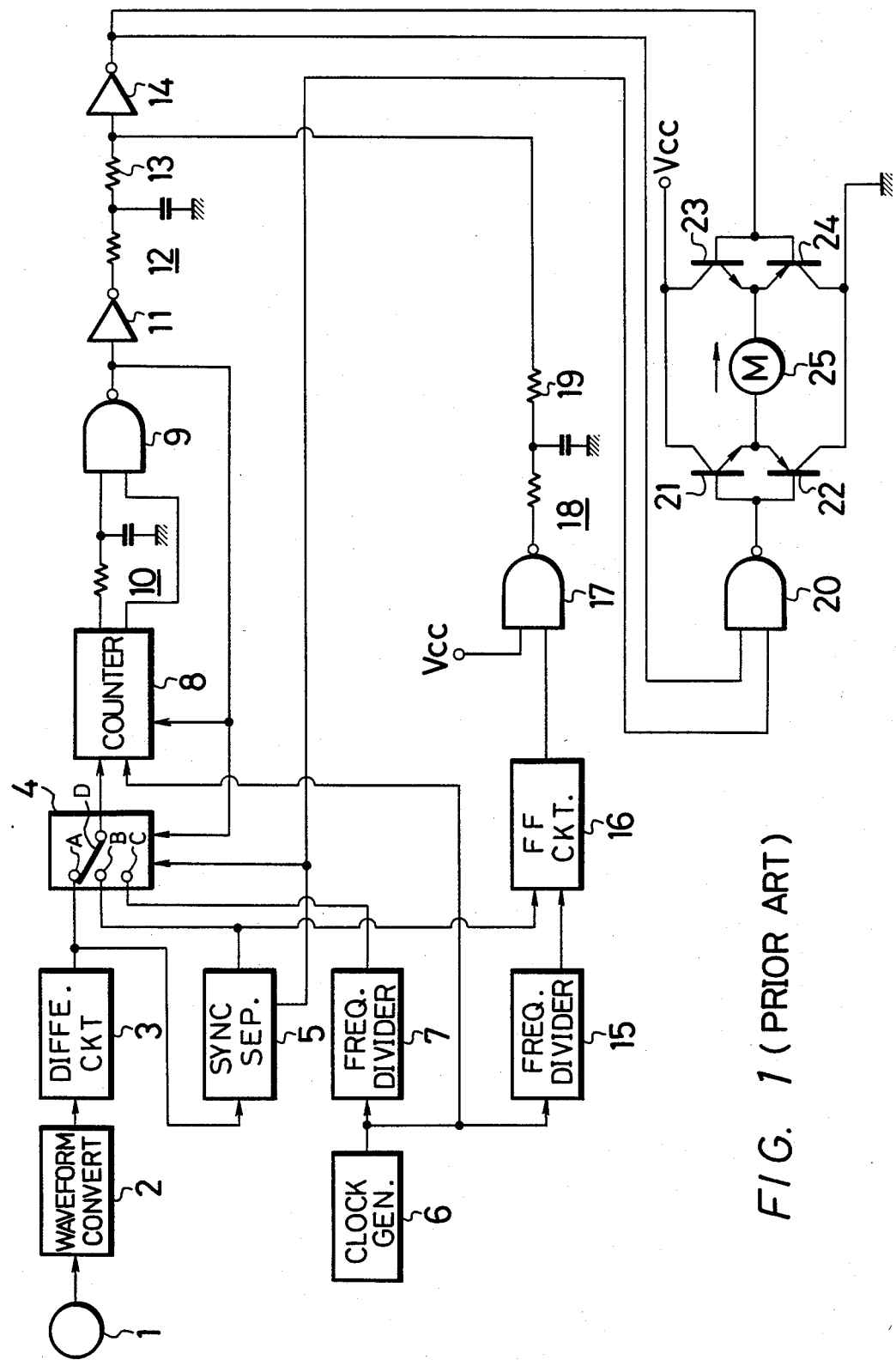
FIG. 1 is a systematic block diagram showing a conventional driving apparatus for a recording medium with a servo circuit.
Figure 2:
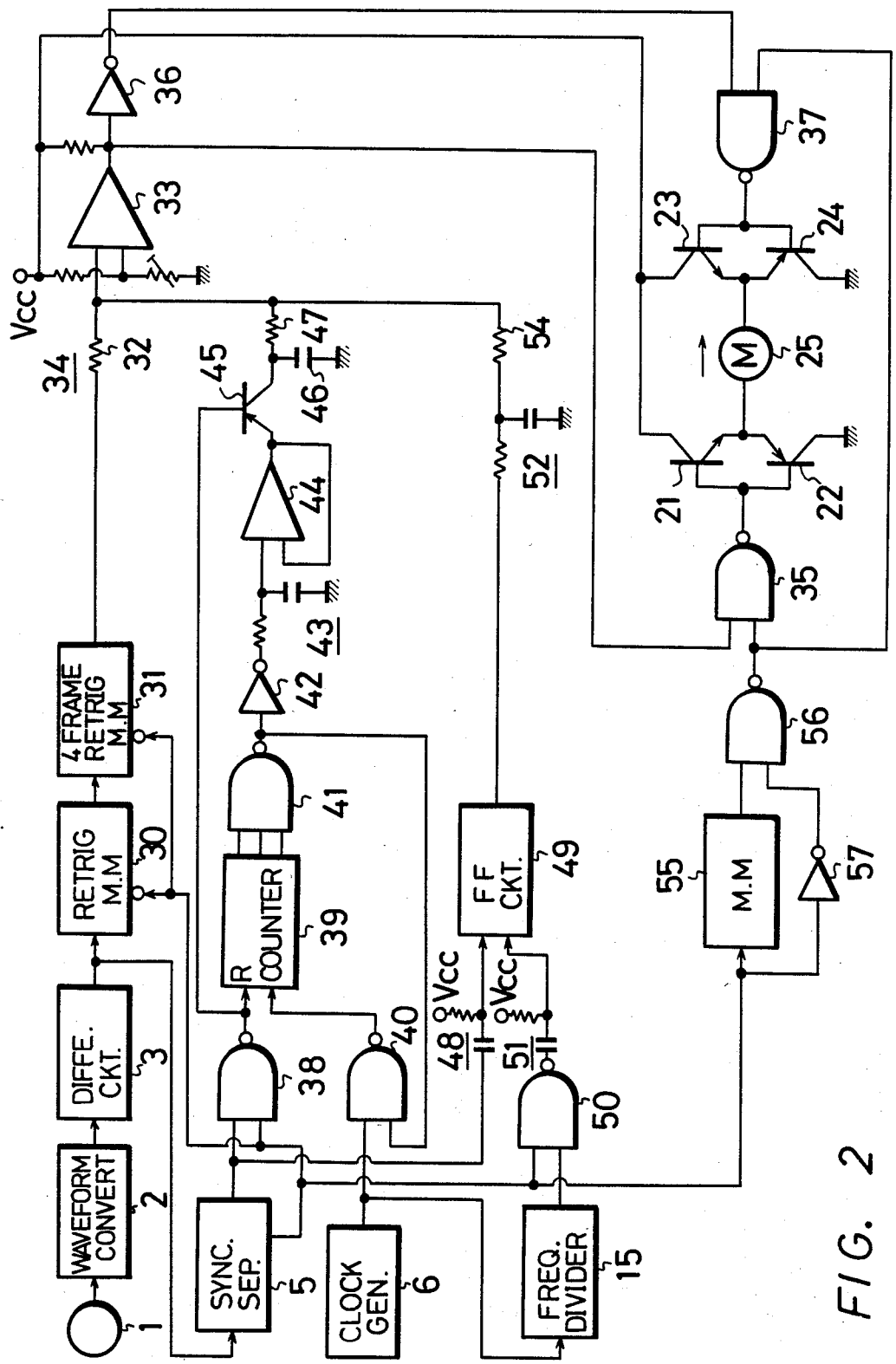
FIG. 2 is a systematic block diagram showing an embodiment of the driving apparatus for a recording medium with a servo circuit according to the present invention.

FIG. 2 is a systematic block diagram schematically showing the whole of such driving apparatus for a recording medium.

As shown in FIG. 2, in this embodiment of the invention, the signal from a differentiating circuit 3 is supplied to a retriggerable monostable multivibrator 30 having the inversion period of 11 clocks. The output from this monostable multivibrator 30 is supplied to a retriggerable monostable multivibrator 31 having the inversion period of 4 frames. The lock indicating signal from a synchronizing separating circuit 5 is supplied to the enable terminals of the respective monostable multivibrators 30 and 31.

In this case, until the synchronizing separating circuit 5 is locked, the monostable multivibrators 30 and 31 are being respectively set to the operation state. During this period, when the interval of "1" in the reproduced signal is more than 11 clocks, the multivibrator 30 is inverted and the multivibrator 31 generates the signal which is "1" during four frame periods. When the interval "1" in the reproduced signal becomes more than 11 clocks repeatedly, the output from the monostable multivibrator 31 becomes "1" continuously.

This signal is supplied through a resistor 32 to a comparing circuit 33.

The comparing circuit 33 is supplied with an arbitrary potential from a voltage dividing circuit 34. In this case, when the input signal is "1", the output from the comparing circuit 33 becomes also "1". The compared output therefrom is supplied to a NAND circuit 35 and also supplied through an inverter 36 to a NAND circuit 37. The outputs from the NAND circuits 35 and 37 are respectively supplied to the bases of the transistors 21, 22 and those of transistors 23, 24.

Therefore, during the period until the synchronizing separating circuit 5 is locked, when the other inputs of the NAND circuits 35 and 37 are normally "1" and the output from the monostable multivibrator 31 becomes "1", a current flows through a motor 25 in the arrow direction. Thus, the motor 25 is accelerated to make the disc rotation up to a predetermined speed and a so-called pull-in operation of the rotation speed is carried out.

The synchronizing signal from the synchronizing separating circuit 5 is supplied through a NAND circuit 38 to the reset terminal of a counter 39. The lock indicating signal from the synchronizing separating circuit 5 is supplied to the NAND circuit 38. Further, the clock signal from the check signal generator 6 is supplied to the count terminal of the clock signal generator 6 through a NAND circuit 40.

When, for example, the clock frequency is 2.16 MHz and the frame frequency is 7.35 kHz, the outputs from the counter 39 regarding the count values [1], [32] and [256] are supplied to a NAND circuit 41. When the count value of the counter 39 becomes [289], the output from the NAND circuit 41 becomes "0". This output from the NAND circuit 41 is supplied to the NAND circuit 40. Thereafter, the supply of the clock signal is stopped and the output from the counter 39 is fixed to the counter value, [289].

Further, the output from the NAND circuit 41 is supplied through an inverter 42, an integrating circuit 43 and an amplifier 44 to a switching element 45. This switching element 45 is turned on by the output from the NAND circuit 38 and the signal through the switching element 45 when it is made on is supplied to a capacitor 46.

Figure 3A:
FIGS. 3A to 3I are respectively waveform diagrams useful for the explanation thereof.
Figure 3B:
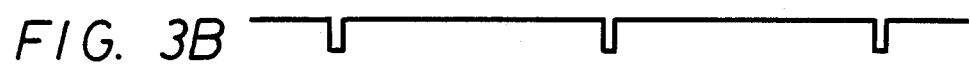
Figure 3C:
Figure 3D:

With this circuitry, when there exists the frame synchronizing signal as, for example, shown in FIG. 3A, the output from the inverter 42 becomes as shown in FIG. 3B. In this case, since $$2.16 \text{ (MHz)} \div 7.35 \text{ (kHz)} \approx 294$$

is established, the period during which the output from the inverter 42 becomes "1" is calculated as $$294 - 289 = 5$$

thus being about 5 clock periods. During about 5 clock periods, the output signal "1" from the inverter 42 is supplied to the integrating circuit 43 which then forms a signal shown in FIG. 3C. This signal is sampled by the switching element 45 which is controlled by the output from the NAND circuit 38 and the sampled value is held in the capacitor 46 from which a peak value shown in FIG. 3D is derived. This peak value corresponds to the interval of the reproduced synchronizing signals, namely, the speed of the disc. In other words, when the rotation speed of the motor 25 is higher than a predetermined constant linear velocity, the period during which the output from the inverter 42 is "1" becomes short and hence the peak value from the capacitor 46 becomes low. Conversely, when the rotation speed of the motor 25 is higher than the predetermined constant linear velocity, the period during which the output from the inverter 42 is "1" becomes long with the result that the peak value from the capacitor 46 becomes high. This peak value from the capacitor 46 is supplied to the comparing circuit 33 through a resistor 47.

Moreover, the synchronizing signal from the synchronizing separating circuit 5 is supplied through a differentiating circuit 48 to the reset terminal of a flip-flop circuit 49. The reference synchronizing signal from the frequency dividing circuit 15 is supplied to a NAND circuit 50, which is also supplied with the lock indicating signal from the synchronizing separating circuit 5. The output from the NAND circuit 50 is supplied to the set terminal of the flip-flop circuit 49 through a differentiating circuit 51. And, the output from this flip-flop circuit 49 is supplied to an integrating circuit 52.

Figure 3E:
Figure 3F:
Figure 3G:

With this circuitry, when the reference synchronizing signal is as shown in FIG. 3E, if the synchronizing separating circuit 5 is locked, the flip-flop circuit 49 generates the signal shown in FIG. 3F. This signal is integrated to thereby form a signal 3G corresponding to the phase difference between the reproduced synchronizing signal shown in FIG. 3A and the reference synchronizing signal shown in FIG. 3E.

This integrated signal is supplied to the comparing circuit 33 through a resistor 54.

Figure 3H:
Figure 3I:

Thus, to the comparing ciruit 33 is supplied the signal shown in FIG. 3H, which signal results from adding the signal from the capacitor 46 to the signal from the integral circuit 52. This signal is compared with a reference level a (refer to FIG. 3H) determined by the voltage dividing circuit 34 in the comparing circuit 33 so that the comparing circuit 33 generates a signal shown in FIG. 3I which is pulse-width-modulated in correspondence with the rotation speed of the disc and the phase difference between the synchronizing signals.

Accordingly, in the period after the synchronizing separating circuit 5 is locked, when the other inputs to the NAND circuits 35 and 37 are ordinarily "1" and the output from the comparing circuit 33 becomes low potential, the current flows through the motor 25 in the arrow direction, while when the output from the comparing circuit 33 becomes high potential, the current in the direction opposite to the arrow direction flow through the motor 25 thus performing the speed servo and the phase servo for the disc rotation.

Moreover, the lock indicating signal from the synchronizing separating circuit 5 is supplied to the retriggerable monostable multivibrator 55 having the inversion period of, for example, 3 frames and the output therefrom is supplied to a NAND circuit 56. The lock indicating signal is also supplied through an inverter 57 to the NAND circuit 56. The output from this NAND circuit 56 is supplied to the other inputs of the NAND circuits 35 and 37.

With this circuitry, when normally the synchronizing separating circuit 5 is locked, the monostable multivibrator 55 is not inverted and the outputs from the multivibrator 55 and the inverter 57 are both "0"s. Thus, the output from the NAND circuit 56 becomes "1" and then is supplied to the other inputs of the NAND circuits 35 and 37. On the other hand, when a dropout occurs due to scratches and so on on the surface of the disc and the lock indicating signal is not generated from the synchronizing separating circuit 5, the monostable multivibrator 55 is inverted at the trailing edge of the lock indicating signal and the output therefrom becomes "1" and the output from the inverter 57 also becomes "1". Thus, the output from the NAND circuit 56 becomes "0". Thus, the outputs from the NAND circuits 35 and 37 are both fixed to "1"s so that the transistors 21 and 23 are turned on and the transistors 22 and 24 are turned off. Therefore, no current flows to the motor 25, and hence the motor 25 is rotated by only the moment of inertia. When the lock indicating signal is recovered or again generated from the synchronizing separating circuit 5, the output from the inverter 57 becomes "0" and the output from the NAND circuit 56 becomes "1". Further, when the lock indicating signal is continuously "0" over 3 frames at the start time of the motor 25 and due to dropout of long time, the output from the multivibrator 55 is returned to "0" and the output from the NAND circuit 56 becomes "1" so that the pull-in operation of the rotation speed is performed by the monostable multivibrator circuits 30 and 31.

Accordingly, when the normal reproduced signal is not obtained due to dropout and so on, the current flowing to the motor 25 is off and the servo can be prevented from being recklessly carried out by the incorrect signal. Also, when the servo is greatly displaced at the start of the motor and due to dropout of long time, the pull-in operation can be carried out.

As set forth above, the pull-in operation, the speed servo, the phase servo and the dropout treatment are carried out by the present invention. According to the circuitry thus made, the displacement of the servo relative to 289 clocks particularly in the speed servo is detected, the accuracy of the servo becomes quite high. Thus, even if the frequency of the phase servo is made high, no trouble occurs or superior servo can be carried out. The servo system used in the present invention is formed by the combination of the digital system employing the counter with the analog circuit system, so that as compared with the servo system the whole of which is performed by the digital circuit, the servo system according to the present invention can be simplified in circuit construction and manufactured at low cost. Moreover, since the servo circuit used in the present invention is of the digital system, it can hardly be affected by temperature characteristic and so on.

FIG. 4 is a block diagram showing another embodiment of the driving apparatus for a recording medium according to the present invention. In FIG. 4, like parts corresponding to those in FIG. 2 are marked with the same references and their detailed explanation will not be made for simplicity.

As shown in FIG. 4, the reference synchronizing signal from the frequency dividing circuit 15 is supplied through the NAND circuit 38 to the reset terminal of the counter 39, while the reproduced synchronizing signal from the synchronizing separating circuit 5 is supplied to a multiplying circuit 53 to produce a multiplied clock signal which is then supplied to the count terminal of the counter 39 through the NAND circuit 40. The output from the peak hold circuit is inverted in polarity by an operational amplifier 58. The synchronizing signal from the synchronizing separating circuit 5 is also supplied through the differentiating circuit 48 to the set terminal of the flip-flop circuit 49, while the output from the NAND circuit 50 is supplied to the reset terminal of the flip-flop circuit 49 through the differentiating circuit 51. Thus, the signal corresponding to a phase difference therebetween is obtained from the flip-flop circuit 49. This signal is inverted in polarity by the operational amplifier 58. Thus, the similar operation of that of the first embodiment shown in FIG. 2 can be carried out by the second embodiment shown in FIG. 4.

According to the present invention, the speed servo having high accuracy can be effected with a simple circuit construction.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

I claim as my invention

1. Driving apparatus for use with a record medium having a signal recorded thereon, said signal including a periodic synchronizing signal of a first frequency, said apparatus comprising:
motor means for driving said record medium;
sync signal reproducing means for reproducing said synchronizing signal;
clock means for generating clock pulses having a second frequency substantially higher than said first frequency;
counter means for counting said clock pulses from said clock means to a preset value n, n being less than said second frequency divided by said first frequency, said counter means producing a digital output signal and being reset by said synchronizing signal;
circuit means coupled to said counter means for producing an analog output signal which corresponds to a time interval from the time when said counter means reaches said preset value n to the time said counter means is reset, said circuit means comprising inverter and integrator means responsive to said digital output signal from said counter means to produce an integrated signal and sample-and-hold means for sampling and holding said integrated signal; and
comparator means for comparing said analog output signal with a reference signal to produce a control signal for controlling said motor means to drive said record medium at a constant linear speed relative to a pickup device.

2. The driving apparatus of claim 1; wherein said sample-and-hold means samples and holds said integrated signal when said counter means is reset.

3. The driving apparatus of claim 1; and further comprising phase servo loop means having a phase controlled in response to the phase difference between said synchronizing signal and said clock pulses.

4. The driving apparatus of claim 3; wherein said phase servo loop means includes flip-flop means having a set terminal supplied with said clock pulses and a reset terminal supplied with said synchronizing signal and generating an output signal; and filter means receiving said output signal from said flip-flop means and generating a signal having a triangular waveform in response thereto.

5. The driving apparatus of claim 1; and further comprising:
means for supplying current to said motor means;
means for supplying a dropout signal indicative of a dropout of a signal reproduced from said signal recorded on said record medium; and
switch means for turning off said current to said motor means in response to said dropout signal.

* * * * *